(12) United States Patent
Flosbach et al.

(10) Patent No.: US 6,584,829 B1
(45) Date of Patent: Jul. 1, 2003

(54) METHOD FOR OPERATING A FILM LEAK DETECTOR AND FILM LEAK DETECTOR SUITABLE FOR CARRYING OUT THIS METHOD

(75) Inventors: Rudolf Flosbach, Wipperfurth (DE); Rudi Widt, Köln (DE)

(73) Assignee: Inficon GmbH (DE)

( * ) Notice: Subject to any disclaimer, the term of this patent is extended or adjusted under 35 U.S.C. 154(b) by 0 days.

(21) Appl. No.: 09/807,162

(22) PCT Filed: Jul. 2, 1999

(86) PCT No.: PCT/EP99/04573
§ 371 (c)(1),
(2), (4) Date: Apr. 9, 2001

(87) PCT Pub. No.: WO00/22399
PCT Pub. Date: Apr. 20, 2000

(30) Foreign Application Priority Data

Oct. 10, 1998 (DE) .......................... 198 46 799

(51) Int. Cl.[7] .......................... G01M 3/22; G01M 3/32
(52) U.S. Cl. .......................... 73/49.2; 73/40.7; 73/49.3
(58) Field of Search ................ 73/40.7, 49.2, 73/49.3

(56) References Cited

U.S. PATENT DOCUMENTS

| 3,027,753 A | * | 4/1962 | Harder, Jr. ............... 73/40.7 |
| 3,813,923 A | * | 6/1974 | Pendleton ................ 73/40.7 |
| 4,294,106 A |   | 10/1981 | Gevaud et al. ............ 73/40.7 |
| 4,487,058 A |   | 12/1984 | Mennenga ................ 73/40.7 |
| 4,791,806 A |   | 12/1988 | Wade .................... 73/40.7 |
| 4,918,975 A | * | 4/1990 | Voss .................... 73/40.7 |
| 4,984,450 A | * | 1/1991 | Burger .................. 73/40.7 |
| 5,661,229 A | * | 8/1997 | Bohm et al. ............. 73/40.7 |
| 5,703,281 A |   | 12/1997 | Myneni |
| 6,189,369 B1 | * | 2/2001 | Yokogi .................. 73/40.7 |

FOREIGN PATENT DOCUMENTS

| DE | 4343912 A1 |   | 6/1995 |         |
| DE | 19642099   |   | 4/1998 | 73/40.7 |
| EP | 475246     | * | 3/1992 | 73/40.7 |
| JP | 7-325006   | * | 12/1995 | 73/40.7 |
| SU | 868389     | * | 9/1981 | 73/40.7 |
| SU | 1368682    | * | 1/1988 | 73/40.7 |
| SU | 1651119    | * | 5/1991 | 73/40.7 |

* cited by examiner

Primary Examiner—Daniel S. Larkin
(74) Attorney, Agent, or Firm—Wall Marjama & Bilinski

(57) ABSTRACT

A method for operating a film leak detector (1) which includes two films (5, 6) each stretched in a frame (3, 4), which, with a test sample (79) emplaced, delimit a test chamber (80). The detector is equipped with two vacuum pumps (13, 30), in which first the test chamber (80) is evacuated and, after the evacuation operation, a leak detection operation takes place. In order to avoid test gas pollution and impurities during the first phase of the evacuation of the test chamber (80), only one (13) of the two vacuum pumps is operated and during the leak detection operation only the second vacuum pump (30) is operated.

18 Claims, 3 Drawing Sheets

METHOD FOR OPERATING A FILM LEAK DETECTOR AND FILM LEAK DETECTOR SUITABLE FOR CARRYING OUT THIS METHOD

BACKGROUND OF THE INVENTION

The invention relates to a method for operating a film leak detector, which comprises two films each stretched in a frame, which, with the test sample emplaced, delimit a test chamber, and which is equipped with two vacuum pumps, in which first the test chamber is evacuated and, after the evacuation operation, switching to leak detection operation is carried out. The invention, furthermore, relates to a film leak detector suitable for carrying out the method.

Film leak detectors of the type involved here are known from DE-A-196 42 099.

SUMMARY OF THE INVENTION

The present invention is based on the task of operating and further developing a film leak detector of the above described type such that contaminations and/or impurities leading to error measurements are avoided.

This task is solved through the measures specified in the patent claims.

BRIEF DESCRIPTION OF THE DRAWINGS

Further advantages and details of the invention will be explained in conjunction with the embodiment examples shown in the Figures. Therein depict.

DESCRIPTION OF THE INVENTION

Figure 1:
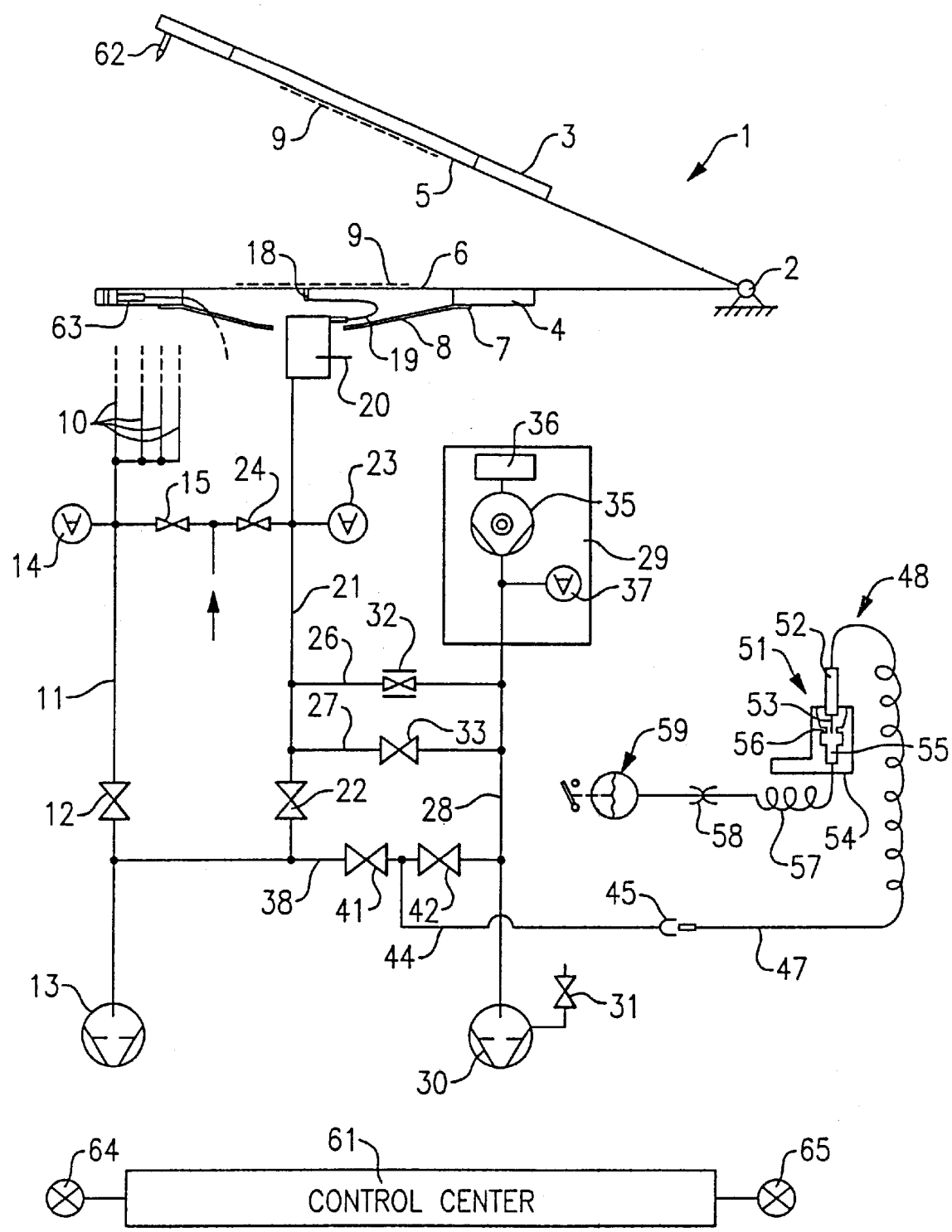
FIG. 1 schematically a film leak detector according to the invention including its circuit diagram, FIG. 2 a partial section through the frames in which the films are stretched, and further details in elevation, FIG. 3 a section through a detachable connection of a connection port fastened on a film with a line extending further, and FIG. 4 a test sample with a patch leak.

FIG. 1 shows schematically a film leak detector 1 with its two frames 3 and 4 connected across an articulation 2 as well as films 5 and 6 stretched therein. The frames 3 and 4 are circular. The lower frame is stayed on a margin 7 of a plate-form bottom 8, preferably comprised of steel. Spund-bonded fabric sections 9 disposed on films 5, 6 ensure the formation of a contiguous test chamber with the test sample emplaced. The fundamental structure of a film leak detector of this type is known, for the remainder, from DE-A-196 42 099.

The lower frame 4 is equipped with several bores not shown in detail, which terminate in the interior of the test chamber, which is formed by the two films 5, 6 with the test sample emplaced. To these bores are connected line sections 10, which communicate across a common line 11 with a valve 12 with the forevacuum pump 13. Upstream with respect to the valve 12 are additionally connected to the line 11 a pressure meter 14 and a venting valve 15.

The lower film 6 is equipped approximately in its center with a line connection 18, which is succeeded by line section 19, filter 20, and line 21 with valve 22. The line 21 is also equipped with a pressure meter 23 and with a venting valve 24.

The section of line 21, disposed between the connection of the pressure meter 23 and the valve 22, communicates across two parallel lines 26 and 27 with a line 28, which extends between the test gas detector 29 and a second forevacuum pump 30. In line 26 is disposed a choke valve 32. Line 27 is equipped with a valve 33.

The forevacuum pump 13 is usefully a single-stage [pump], the forevacuum pump 30 is developed as a two-stage [pump]. Pump 30 is equipped with a gas ballast device. With valve 31 open, air (or also inert gas) streams into pump 30.

In the test gas detector 29 is disposed a turbomolecular vacuum pump 35, whose outlet communicates with line 28. To the inlet of the turbomolecular vacuum pump is connected a mass spectrometer 36. In addition, a pressure meter 37 is a component of the leak detector 29, which measures the pressure in line 28.

Downstream with respect to the valves 12 and 22, the two lines 11 and 28 communicate across a line 38 into which the line 21 also terminates. In this line 38 between the termination of line 21 and line 28 are disposed valves 41 and 42. In the section of line 38 disposed between valves 41 and 42 terminates a line 44, which is connected with a coupling 45. The coupling 45 serves for establishing the connection of line 44 with the sniffing line 47 of a sniffer 48. The sniffing probe denoted by 51 of the sniffer 48 comprises a handle 52 and a sniffing tip 53.

For depositing the sniffing probe, a holder 54 is provided. Such is either fastened on the film leak detector 1 or developed as a separate stand. It comprises a void 55 which, when the probe 51 is deposited, contains the sniffing tip. In addition is provided a sealing ring 56 which seals the void 55 against the handle 52 when the probe 51 is deposited. Succeeding the void 55 is a line 57, which communicates across a coupling 58 with an underpressure switch 59 accommodated in the housing of the film leak detector 1. As sniffing line 47 serves in known manner a capillary [tube] (diameter approximately 0.5 mm). This applies also to the line 57, in order for the underpressure generated by the sniffing tip 53 in chamber 55 to exert its effect rapidly on the underpressure switch 59.

In the film leak detector according to FIG. 1 the leak detector cycle proceeds automatically. To control the process flow the control center is provided which is only depicted as a block 61. With it are connected all meters and all structural components to be controlled. This applies also to a switch which is actuated with the closing of the test chamber. In the embodiment example depicted this switch is a proximity switch, which comprises a metal pin 62 provided on frame 3 and a sensor 63 disposed on frame 4. The sensor 62 is connected with the control center 61. Other switches, be they operated electrically, mechanically or optically, can be applied for this purpose.

For the sake of clarity, the great number of electric connection leads between the control center 61 and the structural parts are not depicted. Connected with the control center are also two signal lights 64, 65, of which one lights up green if a test sample is detected to be impermeable and the other red if a test sample is detected to be permeable.

With the operationally ready film leak detector 1, if the test chamber—as depicted in FIG. 1—is opened or if the upper frame 3 is raised from the lower frame 4, all valves—except for valve 41—are closed. After the test sample is placed onto the lower film 6 and after the upper frame 3 is placed onto the lower frame 4, the proximity switch 62, 63 initiates a leak detection process. For this purpose, a check takes place first of whether or not an increased helium background is in the system, which could falsify leakage measurements. This takes place with the aid of the mass spectrometer 36. If it reports too high a background, valve 31 is opened and pump 30 is operated with gas ballast until the helium background has assumed a harmless value.

As a rule, an increased helium background is not present such that with the closing of the test chamber, the leak detection cycle proper also starts. First, valves 12 and 22 are opened. This causes the extremely rapid evacuation of the volume between the films 5 and 6. Outside of the regions in which the spunbonded fabric sections 9 are disposed, the films 5, 6, directly in contact with one another, form the sealing of the test chamber.

Of significance is that in the first evacuation phase only valves 12 and 22 are opened. It occurs only in this first phase that the wall/packaging of the test sample to be tested for leaks suffers a defect, for example could burst. Since in this phase connections between the test chamber and the leak detector are closed, there is no danger of helium pollution or contamination due to the product penetrating out of the test sample.

At a pressure of a few hundred mbar (100 to 300 mbar) the choke valve 32 is opened. It is dimensioned such that the necessary forevacuum pressure of the turbomolecular vacuum pump 35 does not assume impermissibly high values. With the opening of the choke valve 32, the gross leak detection starts. If helium flows through the choke valve 32, it reaches the mass spectrometer 36 in counterflow through the turbomolecular pump 35. If helium is being registered, the test sample is permeable; the leak detection cycle is terminated.

In the event helium is not yet registered, the evacuation process is continued. If the pressure reaches a value measured with apparatus 23, which is of the order of magnitude of the forevacuum pressure of the turbomolecular pump 35, valves 12, 22, and 32 are closed and valve 33 is opened. The phase of the sensitive leak detection starts. This is terminated if either test gas is being registered, thus the test sample is permeable, or after a specific time. Either a fixed time interval is preset or the test is carried out until the pressure (measured with apparatus 23) falls below a certain value. If test gas is not registered within this time, the result allows the conclusion that the test sample is impermeable.

During the sensitive leak detection phase, only lines 19, 21, and 27 represent the connection between the test chamber and the leak detector 29. Bursting of the test sample no longer needs to be anticipated. Between lines 19 and 21, for the remainder, is disposed the particle filter 20, which keeps any impurities away from leak detector 29.

Termination of the leak detection cycle takes place in such manner that all previously open valves—except for valve 41—are closed and valves 15 and 24 are opened. The test chamber is vented, and the upper frame 3 can be raised from the lower frame 4. It is useful if the two frames 3, 4, articulated with one another, in the proximity of the articulation 2 are under the effect of a (not shown) spring device whose force acts continuously in the direction of opening. Its force should be such that the vacuum generated during the leak detection keeps the test chamber closed and that frame 3 assumes its open position after the venting process.

If during the leak test, it is found that a test sample is permeable, it is of interest to the user to locate the site of the leak. For this purpose, the film leak detector according to the invention is equipped with a sniffer 48. It is connected with its sniffing line 47 to line 44 across the coupling 45.

As long as the sniffer 48 is not in use, it is deposited in a holder 54. This holder 54 is equipped with the means 55 to 59 already described, with the aid of which the control center 61 can detect whether or not probe 51 is deposited in holder 54. Other means, be they mechanically, electrically, or inductively actuated switches, can also be used for this purpose.

As long as probe 51 is in holder 54, valve 41 is kept open, as has already been described. Thereby, the sniffer is continuously in standby. Only when it is removed from its holder 54, does valve 41 close and valve 42 open. The gas stream penetrating sniffer 48 thereby reaches line 28 and is maintained by pump 30. In this state, the sniffing leak detection is possible. If helium is picked up by the sniffing tip 53, it reaches the mass spectrometer 36 in counterflow through the turbomolecular pump 35.

The control center 61 is programmed such that switching the sniffer 48 from standby to leak detection operation (switching over valves 41 and 42) does not occur as long as the proximity switch 62, 63 is closed. The simultaneous leak detection leading to error measurements via the film leak detector 1 and via the sniffer 48 is consequently excluded.

Of interest for the user in the quantitative leak detection as a rule is the leakage rate of a detected leak, measured in mbar 1/sec.

In the inspection of test samples produced in high production numbers, however, it is also of interest to measure the concentration of the test gas in the test sample. This can take place thereby that the sniffing tip 53 is inserted into the test sample or that the test sample is provided with a defined leak and in the film leak detector 1 a leak detection cycle is carried out. The control center is therefore developed such that on a (not shown) display the leakage rate as well as also the concentration can be read.

Figure 2:
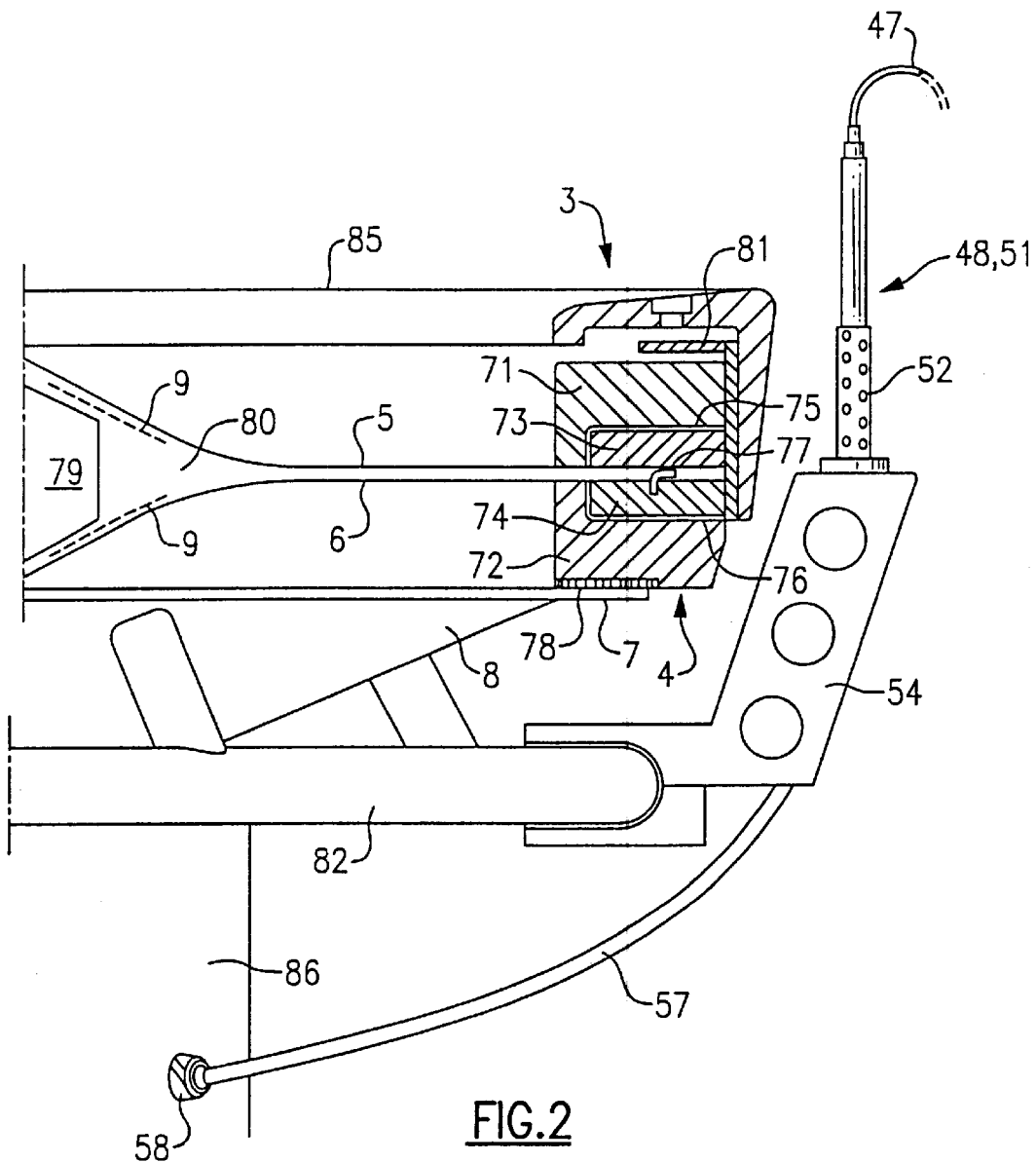

FIG. 2 shows the structure of frames 3 and 4. Each comprises an outer ring 71 or 72 and an inner ring 73, 74. Between the pairs of rings are fastened, preferably adhered, the films 5, 6. Each of the inner rings is disposed in recesses 75, 76, corresponding to one another. The recesses are disposed such that the outer rings 71, 72 in their regions facing the test chamber directly oppose one another and thereby determine the planes of the stretched films 5, 6. In the outer region, the inner rings 73, 74 directly oppose one another. Between them is disposed a lip seal 77. Films 5, 6 extend through the angular gap between the particular ring pairs and are thus adhered all-over.

In FIG. 2 is also evident that the films 5, 6 form a test chamber 80 when a test sample 79 is placed between them. The spunbonded fabric sections 9 ensure the formation of a contiguous test chamber 80.

Ring 72 of the lower frame 4 is stayed on margin 7 of the plate-form bottom 8 and is adhered to it (adhesion layer 78). Associated with the upper frame 3 is a support, which is formed by a steel profile 81 encompassing the frame 3 from the outside and partially from above. Frame 3 is fastened on steel profile 81 so as to float in the axial direction such that, after it is lowered, it comes to rest uniformly on the entire periphery of frame 4. Through the evacuation of the test chamber 80 additionally a pressing force is generated. In the axial direction, the steel profile 81 extends downwardly beyond frame 3 and, in the last phase of the lowering movement, forms a guidance. The trim ring 85 serves for covering the steel ring 81.

FIG. 2 shows further that the depicted film leak detector is equipped with an encompassing handle 82. On it is fastened the holder 54 for the sniffer 48. In holder 54 is disposed the means, already described in connection with FIG. 2, which show whether or not probe 51 of the sniffer 48 is deposited on holder 54. Between holder 54 and the housing 86 extends the capillary hose 57 which is inserted into the coupling 58.

Figure 3:
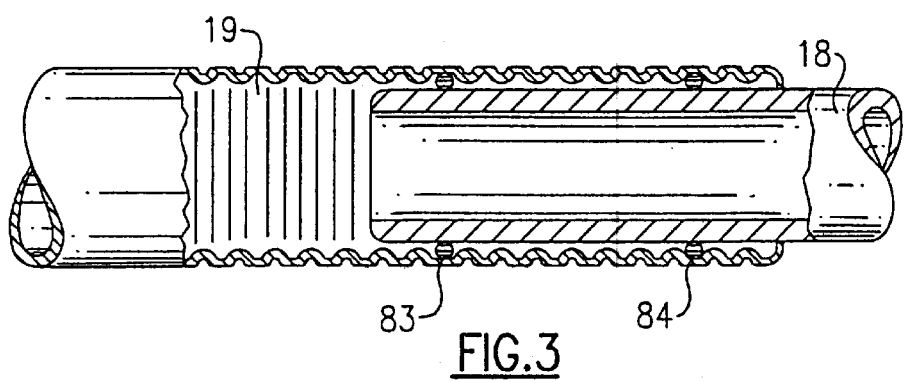

FIG. 3 shows the transition between the connection port 18 and the line section 19 extending further. Both are comprised of synthetic material, preferably polyamide. The line section 19 is developed as a corrugated tube and, together with sealing rings 83, 84, encompasses the connection port 18.

As described earlier, the leak detector 1 can also be used to measure the concentration of the test gas in the test sample if such is provided with a leak. Generating a sufficiently small leak in the wall of a test sample is difficult. The insertion of a relatively thin needle already generates a gross leak, which no longer permits reliable concentration measurements. The danger exists at the beginning of the leak detection cycle, thus during the evacuation of the test chamber and before the switching to the leak measurement, that the test gas already leaks completely out of the test sample. Within the scope of the invention, it is further proposed to provide the test sample with a defined leak. This is accomplished thereby that the test sample to be examined, for example, is pierced with a needle and subsequently the hole is immediately closed with a leak patch. Since, as a rule, the total pressure within and outside of the packaging is identical or at least not significantly different, there are no changes between the piercing and the application of the leak patch represents a defined permeability. This permeability is so slight that during the test the concentration in the packaging does not change. The leak rate signal displayed in this test is a measure of the test gas concentration in the package.

Further advantages and details of the invention will be explained in conjunction with a Figure.

Figure 4:
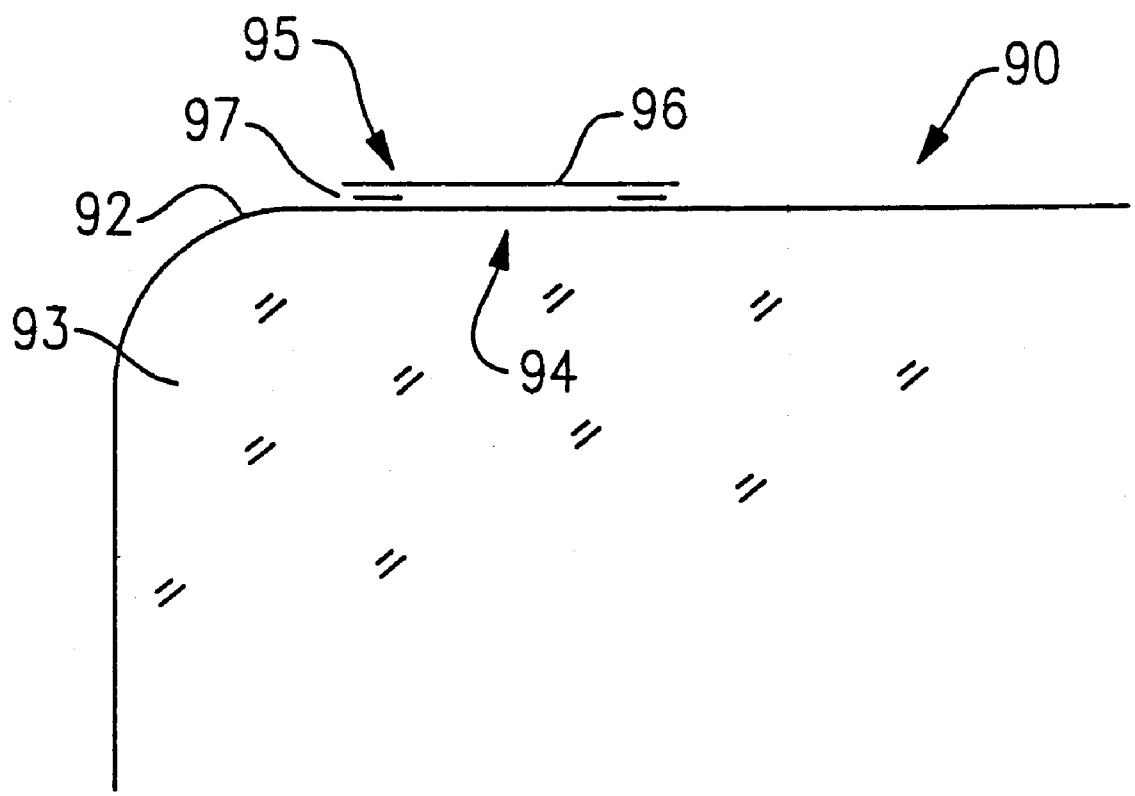

FIG. 4 depicts a portion of a test sample 90 with a relatively thin wall 92 (for example a packaging envelope) and with its content 93 which can be a packaged object of any type (also powder). If test samples 90 of this type are produced in large production numbers, it is useful to introduce into at least some of these test samples a test gas in order to be able to test them for leaks on the basis of random sampling. When using helium as the test gas, this usefully takes place with a concentration of 5 to 25%, preferably 10%. If, during random sample leak testing of the depicted, still intact test sample 90, the presence of helium has not been demonstrated, it must be determined whether or not such is, in fact, an impermeable test sample. This takes place by measuring the concentration of the test gas in the test sample. For this purpose the test sample is provided, for example using a needle, with a leak 94 over which the leak patch 95 is applied. The packaging is subsequently again placed into the test chamber and tested for a leak. As described earlier, based on the result conclusions can be drawn regarding the production quality.

The leak patch 95 comprises a very thin film section 96 permeable by the test gas. If it is not self-adhesive, it can be provided with an adhesive margin 97. The leak patch is subsequently adhered in the manner of an adhesive bandage on the leak 94 generated by piercing the packaging. As material for the film a fluorocarbon has been found to be useful. The thickness and the free area of the film determine the leakage rate. With respect to helium as test gas applies that a fluorocarbon film with a thickness of 25 $\mu$m has a leakage rate of approximately $10^{-4}$ mb.l/s.cm².

What is claimed is:

1. A method for operating a film leak apparatus, said apparatus comprising two films each stretched in a frame, which, with a test sample emplaced, delimit a test chamber, said apparatus further being equipped with two vacuum pumps, selectively connected to said test chamber and a leak detector, said method including the steps of evacuating the test chamber and, after the evacuation step, switching to a sensitive leak detection operation step wherein during the evacuation step of the test chamber only a first one of the two vacuum pumps is operated and during the sensitive leak detection operation step only a second of the two vacuum pumps is operated.

2. Method as claimed in claim 1, in which the test chamber of the film leak detector can be evacuated through bores disposed in one of a set of margins, as well as also through a connection port fastened on one of the two films, wherein the test chamber during the evacuation step is evacuated with the aid of the first vacuum pump only through the bores and that during the sensitive leak detection operation step only the connection port communicating with the second vacuum pump is employed.

3. Method as claimed in claim 2, wherein gas streaming from the test chamber through the connection port is conducted across a particle filter.

4. Method as claimed in claim 1, wherein before the start of the evacuation step, a test gas background testing step is carried out.

5. Method as claimed in claim 4, wherein to remove an increased test gas background, the second vacuum pump is operated with a gas ballast device during said test gas background testing step.

6. Method as claimed in claim 1, including the step of performing an integral leak detection test using gas detection means disposed in said leak detector to determine whether said test chamber is permeable and if said test chamber has been determined to be permeable by said gas detection means using a sniffer to determine the location of a detected leak.

7. Method as claimed in claim 6, wherein each of the integral leak detection and sniffing leak detection steps are performed using the same leak detector.

8. Method as claimed in claim 7, wherein the integral leak detection step and the sniffing leak detection step cannot be carried out simultaneously.

9. Method as claimed in claim 1, wherein for a test sample from which during the integral leak detection step no test gas has penetrated, the method includes the additional step of measuring the test gas concentration of the gas present in a test sample.

10. Method as claimed in claim 9, wherein for checking the test gas concentration in the test sample, the test gas concentration in the test sample is measured such that its wall is provided with a leak and that with this test sample, a leak detection process is carried out.

11. Method as claimed in claim 10, wherein the test sample which serves for checking the test gas concentration, is a test sample, which, in a preceding leak detection process, had been found out to be impermeable.

12. Method as claimed in claim 10, wherein the leak, immediately after its generation, is closed with a leak patch permeable by test gas.

13. The method of claim 12, including the step of providing said patch leak with a film that can be permeated by said gas test.

14. The method of claim 13, wherein the leak patch is provided on one side with an adhesive means.

15. The method of claim 14, wherein the leak patch is round and is equipped with an encompassing adhesive margin.

16. A film leak detecting apparatus, comprising:

two films each stretched in a frame, which, with a test sample emplaced, delimit a test chamber;

two vacuum pumps selectively connected to said test chamber;

a leak detector, wherein a first of the two vacuum pumps is solely used to evacuate the test chamber such that if said test sample bursts that contamination will not reach the leak detector and, after the evacuation operation, a sensitive leak detection operation step takes place during which only a second of the two vacuum pumps is operated; and a control center for automatically controlling the operation of said apparatus.

17. Film leak detecting apparatus as claimed in claim 16, wherein the frames are equipped with a proximity switch which allows detecting when the frames rest one on the other.

18. Film leak detecting apparatus as claimed in claim 16, further including a sniffer, a holder for a sniffer probe, and means for indicating the sniffer probe's deposition in the holder.

* * * * *